March 11, 1958  H. J. HAYDEN  2,826,382
JET ENGINE EXHAUST DEFLECTOR
Filed March 6, 1953

HAROLD J. HAYDEN
INVENTOR.

BY Hubert Miller

United States Patent Office 2,826,382
Patented Mar. 11, 1958

2,826,382

JET ENGINE EXHAUST DEFLECTOR

Harold J. Hayden, Seattle, Wash., assignor to Boeing Airplane Company, Wichita, Kans., a corporation of Delaware Application March 6, 1953, Serial No. 340,785

12 Claims. (Cl. 244—114)

This invention relates to apparatus for deflecting the high temperature, high velocity jets of air and gases which are exhausted from the nozzles of reaction propulsive power plants, such as the present day turbo-jet or turbo-propeller engines for aircraft.

In warming up and ground testing such engines their exhaust blasts are extremely hazardous to persons working nearby, not only because of the extremely high temperature of the blasts, but also due to the force of blast, and to the intensity of the high pitched whistle and accompanying low pitched roar created thereby. Such blasts have been known to pick up pieces of lumber as large as 2" x 12" x 10' and hurl them into the air behind the airplane on which the engines are mounted. They have also been known to permanently destroy the ability of workers to hear sounds in a certain pitch range. Lung and bronchial tube injuries have also been caused by certain fumes accompanying the exhaust blast.

Accordingly, it has become the general practice of those working with jet engines to provide a large cleared area—a sort of "no man's land"—behind each jet engine aircraft to be tested. The space required for testing the engines of each airplane is thus excessive, and the number of airplanes which can be worked on in a given ground area is thus decidedly limited.

Aircraft manufacturers have designed and tested various types of deflectors and deflector fences for this purpose, but to date, so far as can be determined, none has accomplished the desired results. Most deflectors designed and tested to date have re-directed the blast to such an extent as to cause extreme air turbulence in the immediate vicinity of the tail of the aircraft being tested, with consequent extreme buffeting of the empennage surfaces, loosening of rivets, warping of skin, etc.

Generally, it is the object of the invention to provide a deflector which will obviate all the difficulties mentioned above.

Specific objects of the invention are to provide a deflector which will re-direct the substantially horizontal jet blast from reaction propulsive engines into the upper atmosphere without buffeting the empennage surface of the airplane which supports the engines; which breaks up and eliminates the high pitched whistle created by the blast and reduces it to a normal sound, thus protecting the hearing of workers on the opposite side of the deflector; which reduces the roar created by the exhaust blast to such an extent that conversation can be carried on in a normal voice within four feet of the discharge side of the deflector; which is so efficient that workers may carry on their normal duties throughout a full working day within four feet of the discharge side of the deflector while the most powerful jet engine made today is discharging its blast directly toward the opposite side of the deflector; which makes it possible to position another airplane or any other mechanism within four feet of the discharge side of the deflector without fear of damage to the plane while the most powerful jet engine is discharging its blast directly toward the deflector; which makes it possible to position the exhaust nozzles of the jet engines of two airplanes approximately two hundred feet apart with the nozzles of the respective planes directed toward each other, with two deflectors embodying this invention positioned back to back between the airplanes at a distance of approximately forty five feet apart, and to simultaneously runup the engines on both airplanes to 100% power without any possible damage to either airplane or to workers passing between the deflectors, thus approximately doubling the number of airplanes which can be worked on in a given ground area; and which will practically eliminate the ground level accumulation of obnoxious and dangerous fumes normally discharged by jet engines and other reaction propulsive engines.

Another object is to provide a deflector the parts of which may be prefabricated and shipped to any desired point for assembly, or which may be built in relatively small completely assembled sections for ease in shipment to a point of installation, where the sections can be easily joined.

The invention, together with other objects, will be more clearly understood when the following description is read in connection with the accompanying drawings, in which.

A complete deflector fence 10 made in accordance with this invention includes a plurality of identical upright fence sections, preferably four to six feet wide, rigidly secured together, side to side. A sufficient number of sections are joined to extend the opposite ends of the fence laterally beyond the effective blast discharge cones of all jet engines to be handled.

Figures 3, 4:
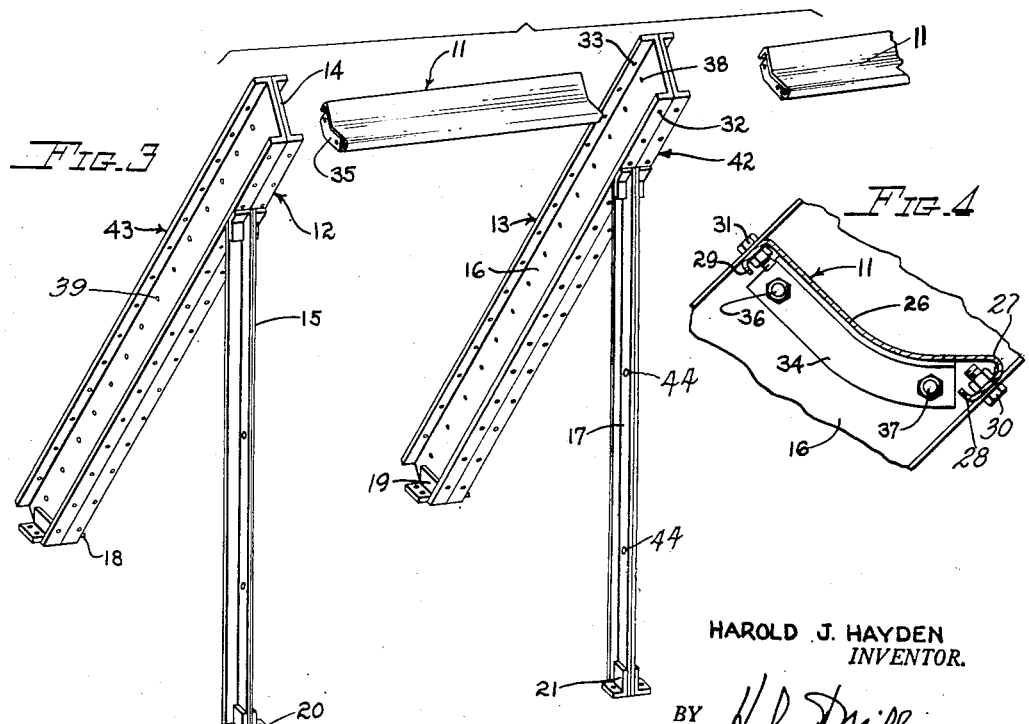
Fig. 3 is an exploded front perspective view showing the details of construction and assembly of a deflector embodying this invention.
Fig. 4 is an enlarged sectional view of a preferred form of deflecting vane, showing the manner in which it is anchored to a supporting frame.

In the illustrated embodiment of the invention each fence section includes a plurality of spaced, superposed, horizontally disposed curved, elongated, concavo-convex vanes 11 laterally bridging the space between and supported by a pair of A-frame side standards, 12 and 13. Parts of three fence sections are shown in Fig. 3.

As shown in this figure, standard 12 includes an inclined channel section rear leg 14, rigidly secured near its upper end to the upper end of a substantially vertical, angle section front leg 15, as by welding. The channel of leg 14 faces toward standard 13. Similarly, standard 13 includes a rearwardly inclined channel section rear leg 16 secured to the upper end of an angle section front leg 17, the channel facing toward standard 12. The rear legs 14 and 16 constitute vane supporting members.

The respective lower ends of members 14 and 16 are bias cut in a plane common to the lower ends of legs 15 and 17. Angle attaching brackets 18 and 19 are rigidly secured, as by welding, to the respective bias cut lower ends of rear legs 14 and 16. Similarly, the lower ends of legs 15 and 17 rigidly carry brackets 20 and 21. All four brackets are perforated to receive anchor bolts 22, 23, and 24 (Fig. 1) to firmly anchor the standards to a supporting surface 25.

The previously mentioned deflecting vanes 11 all have concave upper faces 26. The vanes are so positioned between the vane supporting members 14 and 16 that the respective front edges 27 of their concave upper surfaces occupy a level at least as low as any point on their respective upper surfaces. In other words, their concave surfaces slope generally upwardly and away from the jet exhaust blast, as clearly shown in Figs. 1 and 4.

These vanes are preferably, but not necessarily made of heavy gage sheet metal, with their forward and rear edges rolled downward to form strengthening channels 28 and 29, respectively. At their opposite ends each channel 28 and 29 is perforated to receive attaching bolts 30 and 31. These bolts pass through perforations 32 and 33 in the lower and upper flanges of rear legs 14 and 16, and thus anchor the opposite ends of each vane rigidly to the rear legs of adjacent standards.

As an additional anchoring means, the opposite side edges of each vane are provided with angle section brackets 34 and 35, shaped to the contour of the vane. The upper flange of each bracket 34 and 35 is rigidly secured, as by welding, to the nether surface of the vane, while the vertical flange of each bracket is perforated to receive bolts 36 and 37, which also pass through perforations 38 and 39 in the webs of the channel section rear legs 14 and 16.

Figure 1:
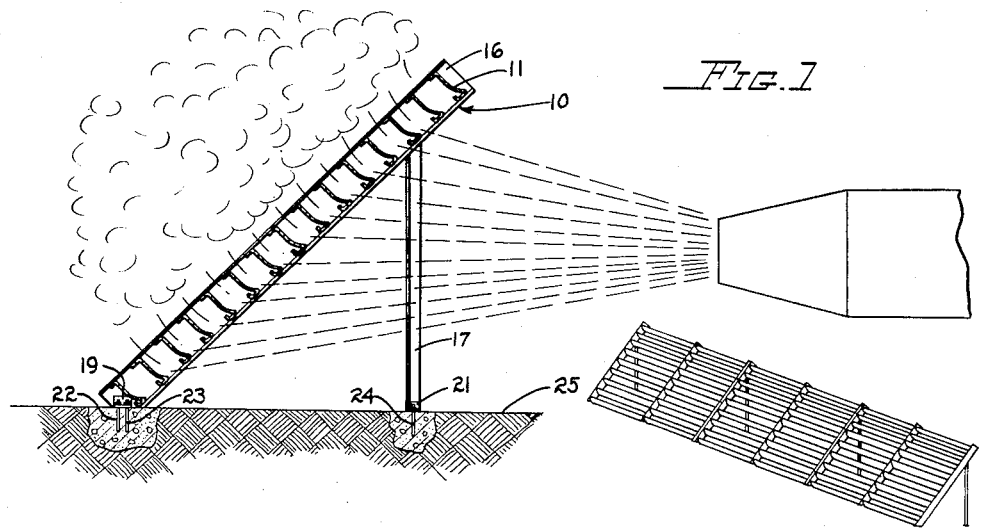
Fig. 1 is a vertical sectional view illustrating the general construction and use of a deflector embodying this invention.

In Fig. 3, standards 42 and 43 are respectively identical to standards 12 and 13. The standard 42 constitutes one frame member of an additional deflector section. Likewise, the standard 43 constitutes one A-frame member of a third deflector section. This view simply illustrates the manner in which a number of sections are connected together to form a complete deflector fence. With the webs of the rear legs of adjacent standards flat against each other, the various bolts 36 and 37 are passed through the webs of both adjacent rear legs as well as through the brackets 34 and 35 at the ends of adjacent vanes. Similarly bolts are passed through matching perforations 44 in the webs of the angle section front legs 15 and 17 of each adjacent standard. In this manner, sections may be secured together to form a unitary deflector fence 200 or more feet in lateral length, if needed. By anchoring the lower ends of the two legs of each A-frame standard to the supporting surface by means of the bolts 22 to 24, as shown in Fig. 1, the entire fence is rigidly supported.

Figures 2, 5:
Fig. 2 is a schematic view illustrating an additional way of using the deflectors contemplated by this invention.
Fig. 5 is a rear perspective view showing a number of deflector fence sections secured together and in operative position.

Fig. 2 illustrates the practical use of deflectors made in accordance with this invention. The deflector should be spaced from 85 feet to 100 feet to the rear of the tail pipe or exhaust cone of any jet engine whose blast is to be controlled. The vane supporting members 14 and 16 should always slope toward and upwardly with respect to the blast, and the vanes will thus slope in a generally opposite direction upwardly and away from the blast, as shown in Fig. 1.

Naturally, the fence should be disposed transversely with relation to the blast axis. The dimensions of the fence should be such that the uppermost deflecting vane 11 is at a level higher than the path of travel of the exhaust. If jet engines are to be faced toward each other, as in Fig. 2, and two fences used, the distance between fences should be around 35 feet to 50 feet. This spacing will prevent the creation of turbulence when the two deflected blasts mingle.

Having described the invention with sufficient clarity to enable those familiar with this art to construct and use it, I claim:

1. A deflector for upwardly re-directing the normally horizontal exhaust blast emitted from the exhaust nozzle of a reaction propulsive engine comprising: a supporting frame including a plurality of rigid laterally spaced side standards, each standard including an upright front member and an inclined rear member, said members being rigidly secured together near their upper ends; a plurality of elongated, spaced, superposed, horizontally disposed jet blast deflecting vanes bridging the respective spaces between said inclined rear members, all of said vanes having a concave upper surface and arranged with their forward edges at a lower elevation than their respective rear edges; and means rigidly securing the opposite ends of each vane between and to respectively adjacent inclined rear members.

2. A deflector for upwardly re-directing the normally horizontal exhaust blast emitted from the exhaust nozzle of a reaction propulsive engine comprising: a supporting frame including a plurality of rigid laterally spaced side standards, each standard including an upright front member and an inclined rear member, said members being rigidly secured together near their upper ends; a plurality of spaced, superposed, horizontally disposed jet blast deflecting vanes bridging the respective spaces between said inclined rear members, all of said vanes having a concave upper surface and being arranged so that the forward edges of the respective concave surfaces are at a level at least as low as any point to the rear thereof on each concave surface; and means rigidly securing the opposite ends of each vane to respective adjacent side surfaces of the inclined rear members.

3. A blast fence structure for use in the open in deflecting the blast from a jet engine, comprising a metallic framework disposed at an angle to the ground, strut members secured to said framework adjacent the top and also anchored to the ground to provide a lean-to-like structure, a series of curved elongated metallic vanes mounted in said framework in spaced parallel relation with their concave side uppermost to deflect a blast upwardly, said vanes being disposed with their long dimension generally parallel to the ground and with their short dimension generally normal to said framework, whereby they slope in the opposite direction to said framework, said structure being composed of a plurality of units each of which comprises a pair of channel members with their flanges extending toward each other and a series of vanes extending therebetween and secured thereto, said units being secured together with adjacent channel members in back to back relation.

4. A blast fence structure for use in the open in deflecting the blast from a jet engine, comprising a metallic framework disposed at an angle to the ground, strut members secured to said framework adjacent the top and also anchored to the ground to provide a lean-to-like structure, a series of curved elongated metallic vanes mounted in said framework in spaced parallel relation with their concave side uppermost to deflect a blast upwardly, said vanes being disposed with their long dimension generally parallel to the ground and with their short dimension generally normal to said framework, whereby they slope in the opposite direction to said framework, said framework comprising girders of I-beam cross section, said vanes being secured to the webs and both flanges of the respective girders.

5. A free standing blast fence for use on the ground to upwardly deflect the generally horizontally traveling blast from a jet engine, which fence comprises; a metallic frame structure composed of horizontally spaced ground supported vane supporting members inclined toward and upwardly with respect to the blast, and having a plurality of vertically spaced, long, narrow, rigid deflecting vanes extending horizontally therebetween and supported thereby, the vanes being disposed with their short dimensions inclined upwardly and away from the direction of travel of the blast in a direction generally opposite to the slope of the vane supporting members.

6. A free standing blast fence for use on the ground to upwardly deflect the generally horizontal blast from a jet engine, which fence comprises: a metallic frame structure which includes elongated rigid frame members arranged side facing side and spaced from each other in similarly disposed positions; and a plurality of elongated spaced, superposed, parallel, blast deflecting vanes bridging the space between and rigidly secured to and supported by adjacent frame members, the operational position of said frame members being at a like acute angle with respect to the ground with the lowermost vane farthest downstream and the uppermost vane farthest upstream with respect to the blast, and the operational position of the short dimensions of the vanes being at an acute angle with respect to the ground, and inclined upwardly and away from the blast to be deflected in a direction generally opposite to the direction of slope of said frame members.

7. The blast fence defined in claim 6, and means connected to said frame members for maintaining them in the specified inclined position.

8. The blast fence defined in claim 6 in which the upper surfaces of all said vanes are concave.

9. The deflector fence defined in claim 6 in which all the vanes are concavo-convex in cross section and are positioned with their concave surfaces uppermost.

10. A blast deflector fence section for receiving and directing upwardly the generally horizontal exhaust blast emitted from a jet engine of a ground supported airplane comprising: elongated laterally spaced vane-supporting members, said members in operational position being inclined toward and upwardly with respect to the blast and disposed at an acute angle with respect to the ground, and having their lower ends supported on the ground; and a plurality of spaced, elongated blast deflecting vanes rigidly connected to and supported by said members, said vanes being disposed with their long dimensions parallel to each other and normal to said vane supporting members, each vane being concavo-convex in cross-section and having its concave surface uppermost, the leading edge of each vane being disposed closer to the blast than and at a lower level than the trailing edge of said vane.

11. A ground supported blast deflecting fence for use in the open to upwardly deflect the horizontally traveling exhaust blast from a jet engine comprising: a rigid metallic frame structure which includes rigid laterally spaced elongated vane supporting members having their common lower ends ground supported and inclined at an acute included angle with respect to the ground, and toward and upwardly with respect to the blast to be deflected; a plurality of spaced elongated horizontal disposed deflecting vanes extending between and having their opposite ends rigidly secured to and supported by adjacent vane supporting members, said vanes being disposed with their short dimensions inclined at an acute included angle with respect to the ground and away from and upwardly with respect to the blast to be deflected, said members and their associated vanes constituting a rigid unitary structure; and rigid upright ground supported struts for maintaining said vane supporting members in the specified inclined position, each strut being secured near its upper end to one of the vane supporting members near its upper end.

12. A deflector fence for upwardly re-directing from the ground the normally horizontal exhaust blast emitted from the jet engine of a ground supported airplane comprising: rigid elongated laterally spaced substantially parallel vane supporting members all disposed in a common inclined plane; means carried by the lower ends of said members for anchoring them to the ground or other supporting surface; a series of elongated superposed deflecting vanes extending laterally between adjacent ones of said vane supporting members; said vanes being disposed with their long dimensions parallel to each other and substantially horizontal with respect to the ground, and with their short dimensions disposed generally transverse with respect to the inclined plane in which the vane supporting members are disposed; means rigidly securing the respective opposite ends of each vane to adjacent ones of said vane supporting members; and rigid upright strut members each being secured near its upper end to one of said vane supporting members near its upper end, the lower ends of said strut members being ground supported to maintain the vane supporting members in their inclined plane, whereby when the inclination of the vane supporting members is toward and upwardly with respect to the direction of travel of the exhaust blast to be deflected, the vanes are disposed in positions inclined upwardly and away from the direction of travel of the exhaust blast.

References Cited in the file of this patent

UNITED STATES PATENTS

| | | |
|---|---|---|
| 979,036 | Schweitzer | Dec. 20, 1910 |
| 1,523,995 | Naud | Jan. 20, 1925 |
| 1,687,542 | Carrier | Oct. 16, 1928 |
| 1,749,068 | De Land | Mar. 4, 1930 |
| 1,925,139 | Fellers | Sept. 5, 1933 |
| 2,608,363 | Shumaker | Aug. 26, 1952 |